United States Patent
Bailey et al.

(10) Patent No.: US 8,321,495 B2
(45) Date of Patent: Nov. 27, 2012

(54) BYZANTINE FAULT-TOLERANCE IN DISTRIBUTED COMPUTING NETWORKS

(75) Inventors: Nicholas R. Bailey, Hedge End (GB); Peter J. Stretton, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 12/824,659

(22) Filed: Jun. 28, 2010

(65) Prior Publication Data
US 2011/0029590 A1    Feb. 3, 2011

(51) Int. Cl.
*G06F 15/16* (2006.01)
(52) U.S. Cl. ....................................................... 709/202
(58) Field of Classification Search ................... None
See application file for complete search history.

(56) References Cited

U.S. PATENT DOCUMENTS
6,859,639 B2 *   2/2005   Spratt et al. .................. 455/11.1

OTHER PUBLICATIONS

Pleisch et al. "FATOMAS—A Fault-Tolerant Mobile Agent System Based on the Agent-Dependent Approach." Proceedings of the International Conference on Dependable Systems and Networks. 2001.*
Pleisch et al. "Modeling Fault-Tolerant Mobile Agent Execution as a Sequence of Agreement Problems." Proceedings fo the 19$^{th}$ IEEE Symposium on Reliable Distributed Systems. 2000.*
Patel et al. "Mobile Agents in Heterogeneous Networks: A Look on Performance." 2006.*
Strasser et al. "Providing Reliable Agents for Electronic Commerce." 1998.*
Rothermel et al. "A Fault-Tolerant Protocol for Providing the Exactly-Once Property of Mobile Agents." Oct. 1998.*
Silva et al. "Fault-Tolerant Execution of Mobile Agents." 2000.*
Araragi. "Byzantine Fault Tolerance for Agent Systems." Proceedings of the International Conference on Dependability of Computer Systems. 2006.*
C. Basile et al., "Active Replication of Multithreaded Applications", http://citeseerx.ist.psu.edu/viewdoc/summary?doi=10.1.1.18.3365, pp. 1-26, 2002.

* cited by examiner

*Primary Examiner* — Scott Christensen
(74) *Attorney, Agent, or Firm* — A. Bruce Clay

(57) ABSTRACT

A mobile intelligent agent is used in a Byzantine fault-tolerant computing network. The mobile intelligent agent ensures that only a single instance of the mobile intelligent agent performs processing in the processing host. The agent interrogates an environment in the processing host for presence of a sibling mobile intelligent agent or a trace left by a sibling mobile intelligent agent. If a sibling mobile intelligent agent or a trace left by a sibling mobile intelligent agent is detected, further execution by the mobile intelligent agent in the processing host is ended. The agent will then be forwarded onward to find a processing host wherein the agent has not been executed.

14 Claims, 4 Drawing Sheets

BYZANTINE FAULT-TOLERANCE IN DISTRIBUTED COMPUTING NETWORKS

BACKGROUND

The present invention relates, in general, to fault tolerance in distributed computing systems, for example, grid computing systems, and, in particular, to controlling the quality of results returned from parallel computational processing tasks in distributed computer networks.

In distributed computing systems, a computing task may be distributed over a network to be performed by a set of hosts, so that a result will more quickly or reliably be returned. Voting or quorum based systems are used to improve the confidence that a correct result has been returned. In general, the concept of Byzantine fault-tolerance describes the ability of a system to defend against some number of Byzantine failures, in which components may act in ways that are erroneous and inconsistent, and in which any results they return may be affected by errors and inconsistencies. Essentially, Byzantine fault-tolerance requires systems to apply statistical methods to the problem of determining how many "votes" for a particular returned result ("a quorum") from a set of result-returning systems (a "processing set") will provide confidence in that result, and thus how many erroneous or misleading results can be disregarded by the system in establishing a single correct result of a computation.

BRIEF SUMMARY

According to one embodiment of the present invention, a method ensures that only a single instance of a mobile intelligent agent performs processing in a processing host. A first mobile intelligent agent is created with a processor in a computation requester. An environment in the processing host is interrogated for presence of a sibling mobile intelligent agent or a trace left by a sibling mobile intelligent agent. If a sibling mobile intelligent agent or a trace left by a sibling mobile intelligent agent is detected, further execution by the first mobile intelligent agent in the processing host is ceased. The first mobile intelligent agent is then sent onward.

In an embodiment of the present invention, a computer program product for ensures that only a single instance of a mobile intelligent agent performs processing in a processing host. The computer program product comprises a computer readable storage medium having computer readable program code embodied therewith. The computer readable program code comprises computer readable program code configured to create a first mobile intelligent agent in a computation requester. Computer readable program code is configured to interrogate an environment in the processing host for presence of a sibling mobile intelligent agent or a trace left by a sibling mobile intelligent agent. Computer readable program code is configured to, response to the interrogating detecting a presence of a sibling mobile intelligent agent or a trace left by a sibling mobile intelligent agent, cease further execution by the first mobile intelligent agent in the processing host. Computer readable program code is configured to cause onward transmission of the first mobile intelligent agent.

In an embodiment of the present invention, a computer system ensures that only a single instance of a mobile intelligent agent will perform processing in a processing host. A processor is programmed to create a first mobile intelligent agent in a computation requester. An environment in the processing host is interrogated for presence of a sibling mobile intelligent agent or a trace left by a sibling mobile intelligent agent. In response to detecting a presence of a sibling mobile intelligent agent or a trace left by a sibling mobile intelligent agent, further execution by the first mobile intelligent agent is ceased in the processing host. The first mobile intelligent agent is then transmitted onward.

BRIEF DESCRIPTION OF THE SEVERAL VIEWS OF THE DRAWINGS

FIG. 2 also illustrates an arrangement of logic elements or computer program code steps required to implement a presently preferred embodiment of the present invention and further refinements thereof in a computer program.

DETAILED DESCRIPTION

Figure 1A:
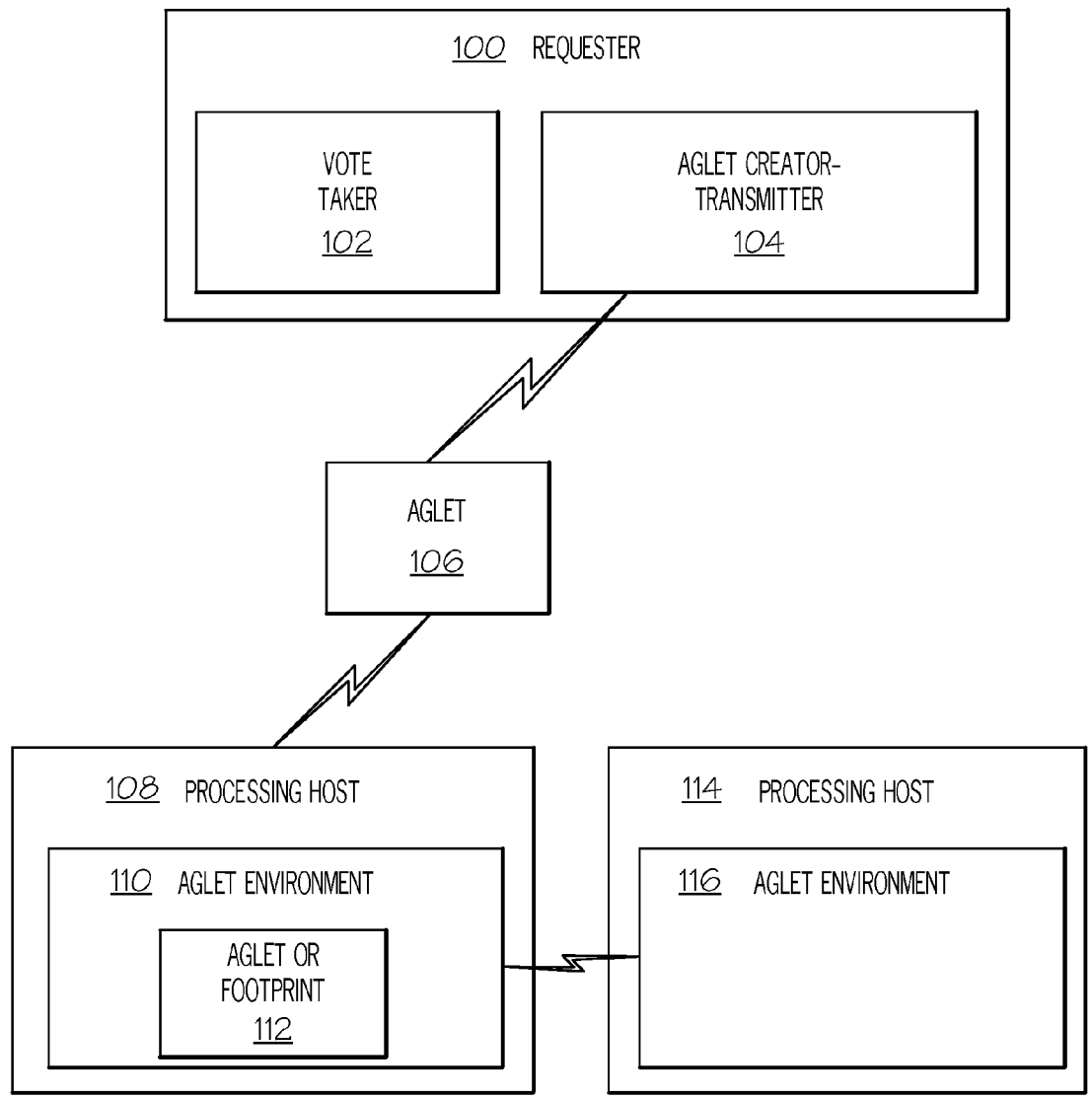
FIG. 1A is a block-level device diagram illustrating an apparatus in a first state in accordance with a presently preferred embodiment of the present invention.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to a flowchart illustration and block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

A computer system in which a preferred embodiment of the present invention is implemented comprises a distributed computing network of processing entities for processing computational tasks in parallel and returning results to a requester system. The requester system aims to achieve a computational result that has some likelihood of being accurate by requesting that the same computational task be performed by plural computer hosts in the network. The requester then compares the results returned by the hosts and applies some metric to the results to determine whether a subset of the results is the same, and whether that subset represents sufficient "votes" to allow confidence in the result to be accorded.

Figure 1B:
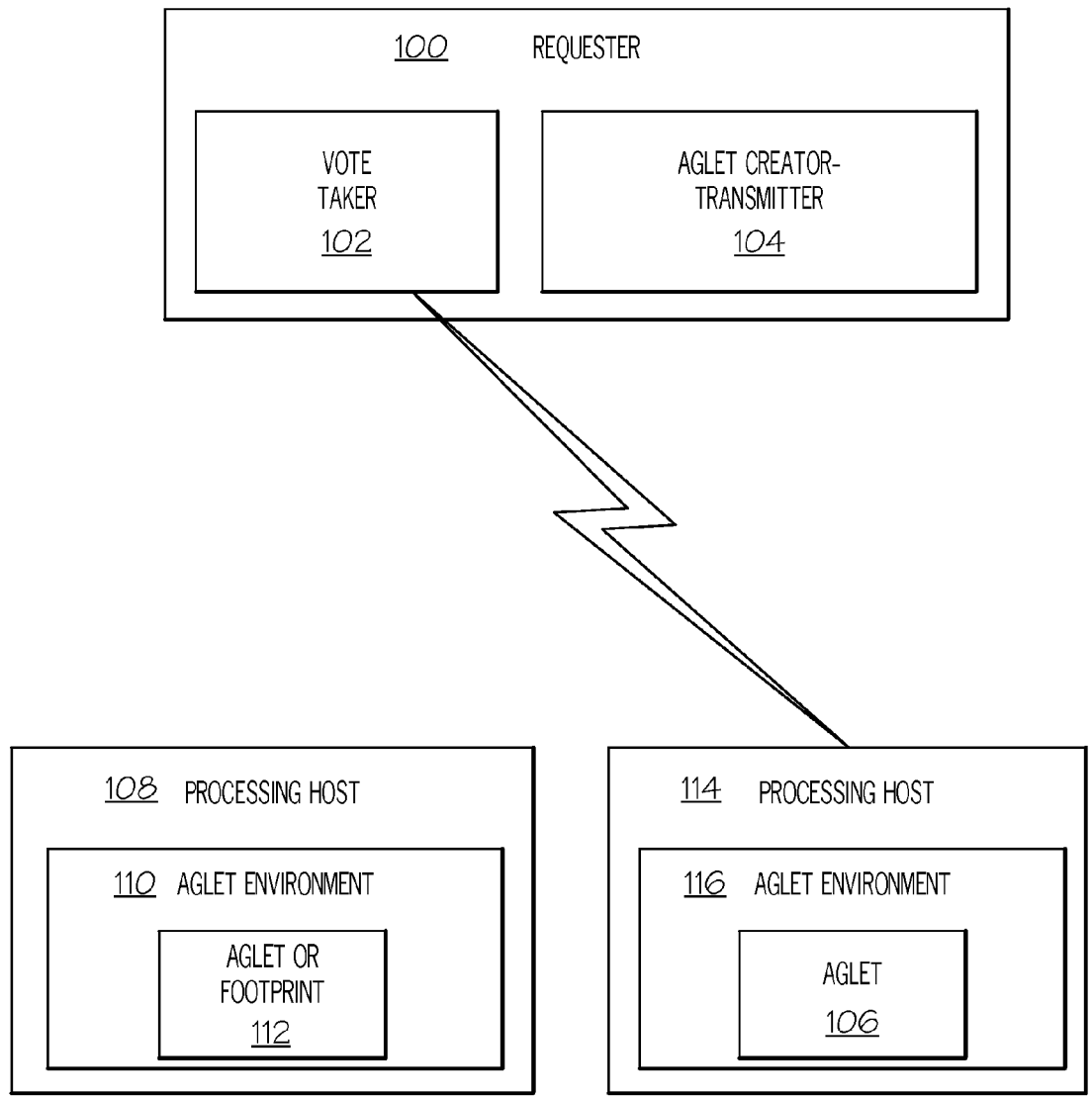
FIG. 1B is a block-level device diagram illustrating an apparatus in a second state in accordance with a presently preferred embodiment of the present invention.
Figure 1C:
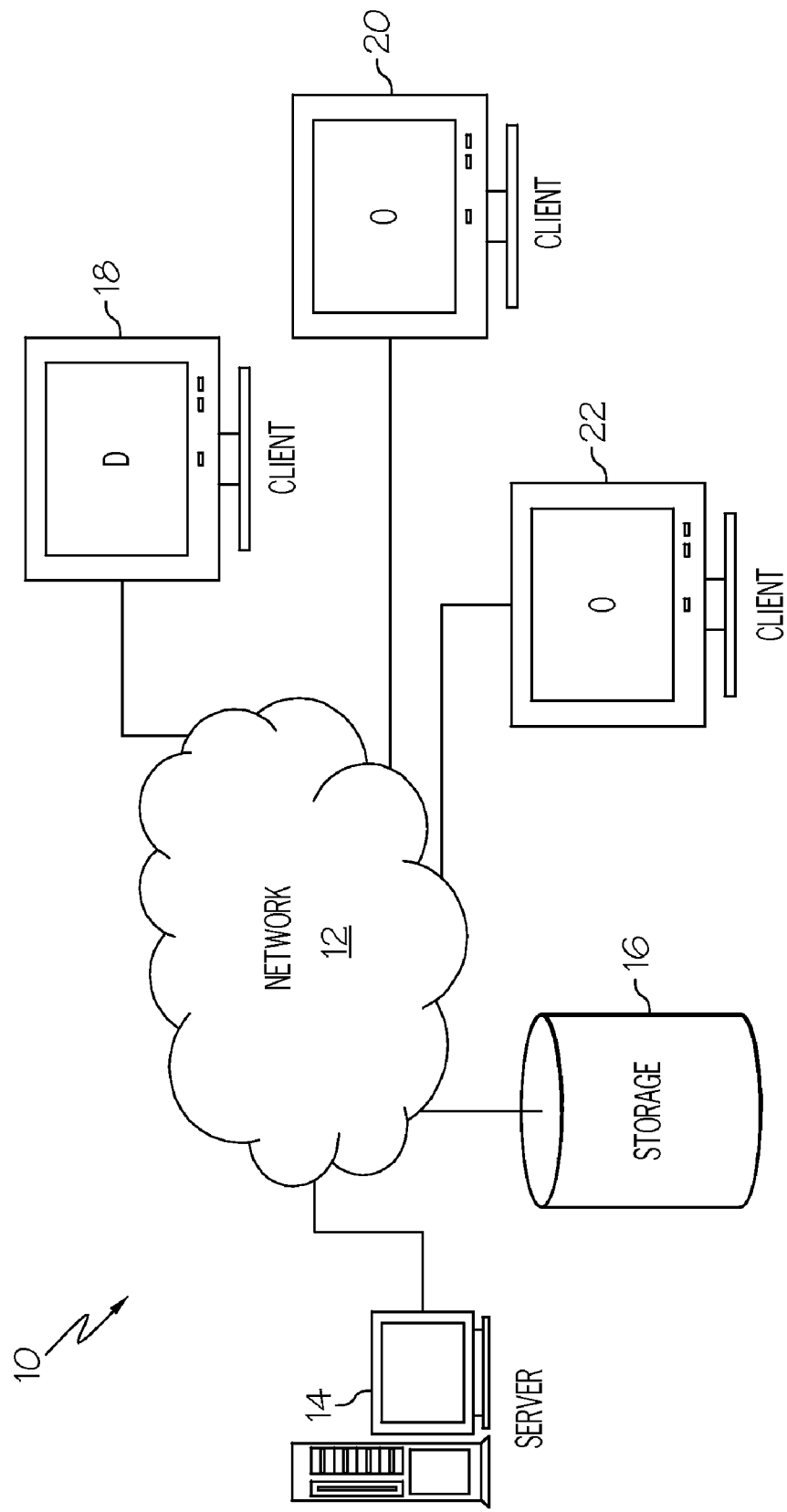
FIG. 1C is an illustration of a computer system which may be adapted for use with an embodiment of the present invention.
Figure 2:
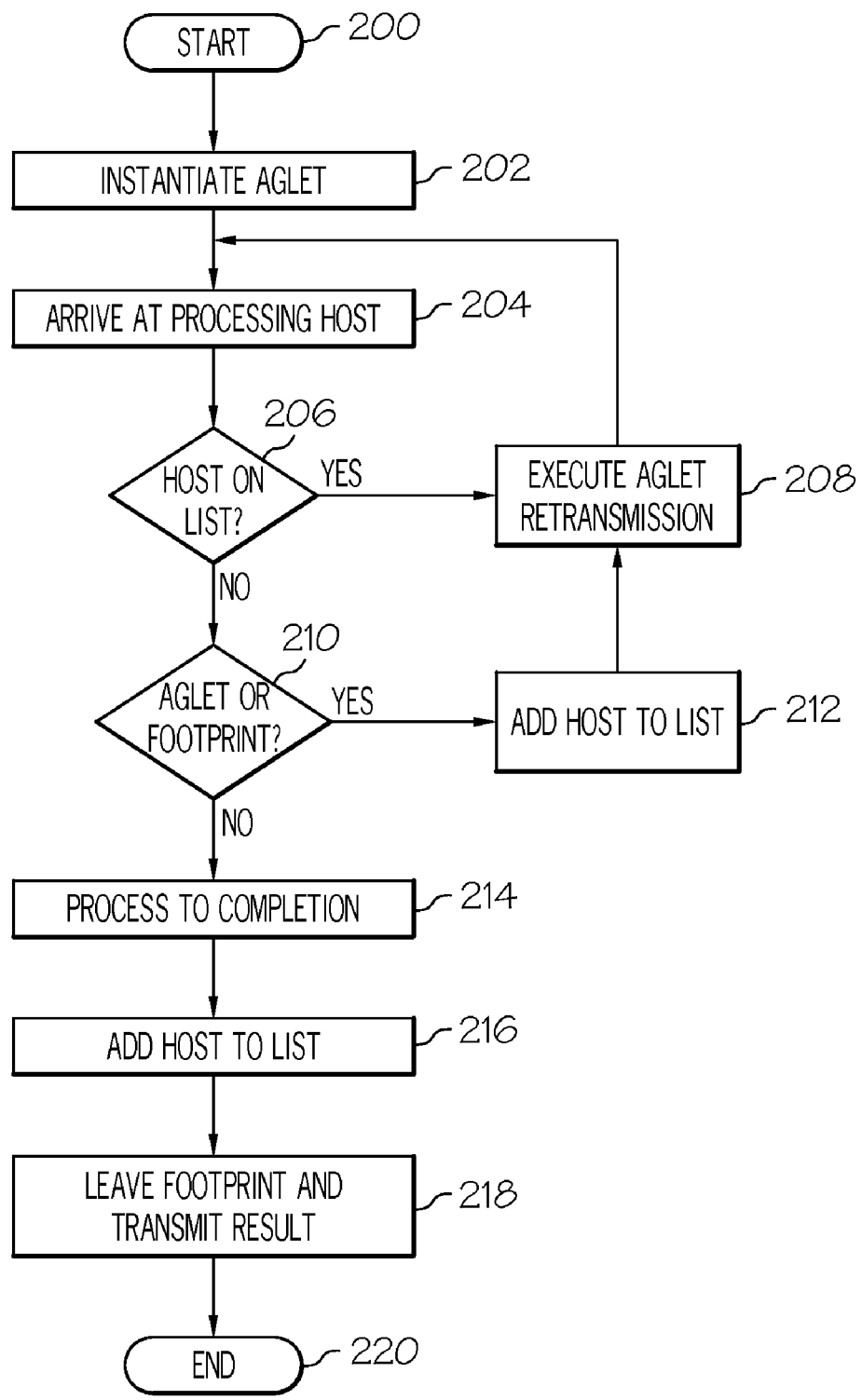
FIG. 2 is a process flow diagram representing a method according to a preferred embodiment of the present invention.

With reference now to the figures, FIG. 1C depicts a network data processing system 10 which is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, server 14 connects to network 12 along with storage unit 16. In addition, clients 18, 20, and 22 connect to network 12. These clients 18, 20, and 22 may be, for example, personal computers or network computers. In the depicted example, server 14 provides data, such as boot files, operating system images, and applications to clients 18-22. Clients 18, 20, and 22 are clients to server 14. Network data processing system 10 may include additional servers, clients, and other devices not shown.

In the depicted example, network data processing system 10 is the Internet with network 12 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1C is intended as an example, and not as an architectural limitation for the present invention.

A computer system in which an embodiment of the present invention is implemented comprises a distributed computing network of processing entities for processing computational tasks in parallel and returning results to a requester system. The requester system aims to achieve a computational result that has some likelihood of being accurate by requesting that the same computational task be performed by plural computer hosts in the network. The requester then compares the results returned by the hosts and applies some metric to the results to determine whether a subset of the results is the same, and whether that subset represents sufficient "votes" to allow confidence in the result to be accorded.

In a conventional distributed computing environment, a requester may have an awareness of the precise hosts that will perform the processing on its behalf, and thus may send its requests for computation to specific hosts on a one-instance-per-host basis. However, in many modern computing environments, such as grid or cloud computing, it is desirable to simply transmit the request for processing out to a wide, but still potentially bounded, constituency of hosts. One way of performing such a broadcast method is by using some form of mobile agent. In such systems, a single host may perform the same computation multiple times on behalf or multiple agents and return results from each instance independently. The multiple agents tasked with performing the same computational task may be conveniently referred to as "sibling agents."

Given that the set of hosts processing the computational task is potentially faulty, and that the faults in the hosts may not be of the fail-stop variety, an embodiment of the present inventions ensures that each host that is made available for use over the lifetime of the task actually acts as host to one, and only one, instance of the task.

This is desirable because (1) if a host suffers a fault and returns erroneous results from one instance, it is not useful to subsequently reuse that host for another instance of the same task, and (2) if a host is hosting two or more instances of the task simultaneously, and it is faulty in a way that commonly affects the two or more instances, their results will be used as part of the vote and might incorrectly sway the final outcome of the vote from the voting set.

One embodiment of the invention thus provides a fault-tolerant distributed parallel computing system comprising mobile, intelligent agents that replicate in a network of connected servers from an originating agent server. Each replicated agent will operate in a single server of the set of servers. A subsequent agent querying the server for the current or past presence of a sibling agent and, responsive to detecting the current or past presence of sibling agent at that server, will cause itself to be onward transmitted to a further connected server until it locates an unoccupied server (a server not having an existing sibling agent). The distributed computing system thus permits only one agent to be operable per server over the lifetime of the task, thereby limiting the effect of a server failure in a given server to the failure of a single agent of the set of agents, and thus increasing the proportion of functioning agents potentially capable of completing the computing task without fault.

One type of mobile intelligent agent is the aglet. In brief, aglets are agent objects with defined sets of methods that enable them to behave in an autonomous fashion, in instantiating themselves in response to a particular "stimulus," and then in serializing their program code and data in order to autonomously send themselves to remote systems. They are further capable of cloning themselves for various purposes, one of which is so that they can forward copies of themselves to remote systems. Aglets have further capabilities which can be programmatically activated, such as the capability of communicating in certain constrained ways with their host systems and also with other aglets present in the same host system.

To preserve the security and integrity of the systems on which aglets execute, they are capable of instantiating themselves only within a sealed-off aglet context, similar to the Java Virtual Machine "sandbox," which enables them to operate within host systems without having the ability to interact to the detriment of the host by, for example, causing corruption to the host's un-sandboxed memory contents.

Turning now to FIG. 1A, there is shown a block-level device diagram illustrating a first state of a system in which an embodiment of the present invention may be implemented. The diagram illustrates a much-simplified system comprising only a single requester 100 (such as, for example, the client 18 of FIG. 1C) and two processing hosts 108, 114 (each of which may be a server, such as, for example, server 14 of FIG. 1C). It will be clear to one of ordinary skill in the art that in practice there will be much more complex system arrangements, but for simplicity and ease of understanding, the elements illustrated and described have been limited to the features necessary to show an operable embodiment.

FIG. 1A shows a requester 100 comprising a vote taker component 102 for Accepting votes from the computational processing hosts 108, 114. Requester 100 is adapted according to an embodiment of the present invention by the provision of an aglet creator-transmitter-receiver component 104 for creating, transmitting and receiving aglets in cooperation with a network of processing hosts 108, 114. Aglet creator-transmitter-receiver component 104 is operable to create and transmit aglet 106 across a network, such as the network 12 of FIG. 1C, to processing host 108. Processing host 108 accepts the aglet into aglet environment 110, where it can be deserialized and begin operation. Before beginning to perform a computational task on behalf of requester 100, aglet 106 interrogates aglet environment 110 to detect the current presence or past trace of a sibling aglet, shown as aglet or footprint 112. Because aglet or footprint 112 exists in processing host 108's aglet environment 110, aglet 106 does not perform any computational task on behalf of requester 100 at this host. Instead, aglet 106 causes itself to be transmitted onward across the network to a different processing host 114, where it interrogates aglet environment 116 to detect the current presence or past trace of a sibling aglet. Because no aglet or footprint exists in processing host 114's aglet environment 116, aglet 106 can perform its computational task on behalf of requester 100 at this host.

Turning to FIG. 1B, aglet 106 is operable to perform its computational task and return its result from processing host 114 to the requester 100, where it will be treated in the conventional manner as a vote by vote taker component 102. Vote taker component 102 is thus receiving votes that can be accorded increased confidence because each vote comes from one, and only one, processing host. The advantages of this will be immediately clear to one of ordinary skill in the art acquainted with the concept of Byzantine fault-tolerance.

Turning now to FIG. 3 and reading the steps of the method as shown in the flowchart in conjunction with FIGS. 1A and 1B, there are shown the steps of a method of operating a distributed computation system according to a presently preferred embodiment. FIG. 3 also illustrates an arrangement of logic elements or computer program code steps required to embody the present invention in a computer program, but for brevity, the method steps will be described here. It will be clear to those skilled in the programming art that the method lends itself to an embodiment in program code stored on a computer readable medium implementing each of the method steps.

The method begins at START 200, and at step 202, aglet 106 is instantiated by aglet creator 104. The aglet traverses the network and arrives at a processing host 108, 114 at step 204. Aglet 106 optionally interrogates its retained list of "called at" hosts (as will be subsequently described in greater detail)

at step 206; if the current proposed host is found at step 206, the aglet causes itself to be retransmitted onward across the network at step 208, and its processing continues from step 204 on arrival at a different processing host 114. If the current proposed host is not found at step 206, the aglet interrogates at step 210 the aglet environment 110, 116 at processing host 108, 114 to detect the presence of a sibling aglet or the trace or footprint left by a sibling aglet 112 after completion of processing at processing host 108, 114. If, as in FIG. 1A, an aglet or footprint 112 is detected by step 210 in aglet environment 110 at processing host 108, aglet 106 adds the current host to its list at step 212 and causes itself to be retransmitted into the network at step 208, and its processing continues from step 204 on arrival at a different processing host 114. If aglet 106 detects at step 210 that there is no aglet or footprint 112 in the aglet environment 116 at processing host 114, it proceeds to process its computational task to completion at step 214. On completion, aglet 106 at step 216 optionally adds the host to its list. At step 218, the aglet leaves a footprint in aglet environment 116 and returns the result of its computational task to vote taker 102. The method according to the preferred embodiment and its optional refinements completes at END 220. The further processing of results by vote taker 102 is conventional within the art of Byzantine fault-tolerant computing, and need not be further described here.

It will be seen by one of ordinary skill in the art that an embodiment of the present invention thus provides a method for controlling the quality of results returned from parallel computational processing tasks in distributed computer networks by ensuring that each instance of a computational task processing agent executes in one, and only one, of the distributed processing hosts. This advantageously limits the impact on the computational outcome of one or more faulty hosts by ensuring that each host has a single vote.

In the optional refinement described at steps 206, 212 and 216, each aglet is provided with the facility to store and act on a "called at list" containing addresses of tried hosts the aglet had to move on from because a sibling was already there (or perhaps because the server was inoperable or too busy). An aglet could thus be modified to: 1) eliminate "no go servers" (where "no go" equates to current or past sibling presence, or as described above, to inoperability of the server, etc.) from the list of onward transmission destinations for the aglet; or (2) to pass the combined "called at list" on to further callers when an aglet is the hosted instance in a server. Such a list has the disadvantage that it would increase in size over time, and thus it might be advisable to limit growth by some factor, perhaps by giving the aglet the facility to prune its list based on time, e.g. all servers tried in the last 1000 ms. It will be clear to one of ordinary skill in the art that this refinement, while presenting certain advantages, is not essential to the embodiment of the present invention.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components (such as a computer processor), firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

A method is generally conceived to be a self-consistent sequence of steps leading to a desired result. These steps require physical manipulations of physical quantities. Usually, though not necessarily, these quantities take the form of electrical or magnetic signals capable of being stored in a memory, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

In one alternative, an embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

What is claimed is:

1. A method for ensuring that only a single instance of a plurality of mobile intelligent agents performs processing in a processing host of a plurality of processing hosts in a Byzantine fault-tolerant computing network, comprising:

creating, by a processor of a computation requester, a first mobile intelligent agent,
said first mobile intelligent agent configured to
perform a specific computational task in at least one processing host of the plurality of processing hosts, and
leave a trace in the at least one processing host when said specific task has been performed by said at least one processing host;
interrogating an environment in the processing host for presence of a sibling mobile intelligent agent or a trace left by a said sibling mobile intelligent agent,
said sibling mobile intelligent agent comprising a duplicate of said first mobile intelligent agent created by the computation requester to perform a same said specific computational task and to leave a same said trace as said first mobile intelligent agent in other processing hosts of the plurality of processing hosts in the Byzantine network;
responsive to detecting a presence of said sibling mobile intelligent agent or a trace left by said sibling mobile intelligent agent in the processing host,
ceasing further execution by said first mobile intelligent agent in the processing host to prevent repeating performance of said same specific task in the processing host; and causing onward transmission of said first mobile intelligent agent to another of the plurality of processing hosts in the Byzantine fault-tolerant computing network to perform the specific computational task; and responsive to not detecting the presence of said sibling mobile intelligent agent or the trace left behind said sibling mobile intelligent agent, executing said first intelligent agent in the processing host, leaving the trace in the environment of the processing host, and returning a result of said executing in the processing host to said computation requester.

2. The method of claim 1, further comprising:
retaining an identifier of the processing host within said first mobile intelligent agent in response to said detecting a presence of said sibling mobile intelligent agent or a trace left by said sibling mobile intelligent agent.

3. The method of claim 2, further comprising:
checking said retained identifier of the processing host prior to onward transmission of said first mobile intelligent agent; and
causing onward transmission to another processing host having an identifier other than said retained identifier.

4. The method of claim 3, wherein a plurality of identifiers are retained as a list within said first mobile intelligent agent.

5. The method of claim 4, wherein said list is limited in size based on a time indicator associated with each of said plurality of identifiers.

6. A computer program product for ensuring that only a single instance of a plurality of mobile intelligent agents performs processing in a processing host of a plurality of processing hosts in a Byzantine fault-tolerant computing network, the computer program product comprising a computer readable storage device having computer readable program code embodied therewith, the computer readable program code comprising:
computer readable program code configured to create a first mobile intelligent agent,
said first mobile intelligent agent configured to
perform a specific computational task in at least one processing host of the plurality of processing hosts, and
leave a trace in the at least one processing host when said specific task has been performed by said at least one processing host;
computer readable program code configured to interrogate an environment in the processing host for presence of a sibling mobile intelligent agent or a trace left by a said sibling mobile intelligent agent,
said sibling mobile intelligent agent comprising a duplicate of said first mobile intelligent agent created by the computation requester to perform a same said specific computational task and to leave a same said trace as said first mobile intelligent agent in other processing hosts of the plurality of processing hosts in the Byzantine network;
computer readable program code configured to, responsive to detecting a presence of a said sibling mobile intelligent agent or a trace left by a said sibling mobile intelligent agent in the processing host,
cease further execution by said first mobile intelligent agent in the processing host to prevent repeating performance of said same specific task in the processing host, and
cause onward transmission of said first mobile intelligent agent to another of the plurality of processing hosts in the Byzantine fault-tolerant computing network to perform the specific computational task; and
computer readable program code configured to, responsive to not detecting the presence of said sibling mobile intelligent agent or the trace left behind said sibling mobile intelligent agent,
execute said first intelligent agent in the processing host,
leave the trace in the environment of the processing host, and
return a result of said executing in the processing host to said computation requester.

7. The computer program product of claim 6, further comprising:
computer readable program code configured to retain an identifier of the processing host within said first mobile intelligent agent in response to said detecting a presence of said sibling mobile intelligent agent or a trace left by said sibling mobile intelligent agent.

8. The computer program product of claim 7, further comprising:
computer readable program code configured to check said retained identifier of the processing host prior to onward transmission of said first mobile intelligent agent; and
computer readable program code configured to cause onward transmission to another processing host having an identifier other than said retained identifier.

9. The computer program product of claim 8, wherein a plurality of identifiers are retained as a list within said first mobile intelligent agent.

10. The computer program product of claim 9, wherein said list is limited in size based on a time indicator associated with each of said plurality of identifiers.

11. A computer system for ensuring that only a single instance of a plurality of mobile intelligent agents performs processing in a processing host of a plurality of processing hosts in a Byzantine fault-tolerant computing network, the system comprising:
a hardware processor programmed to:
create, by a computation requester, a first mobile intelligent agent,
said first mobile intelligent agent configured to
perform a specific computational task in at least one processing host of the plurality of processing hosts, and
leave a trace in the at least one processing host when said specific task has been performed by said at least one processing host;
interrogate an environment in the processing host for presence of a sibling mobile intelligent agent or a trace left by a said sibling mobile intelligent agent,
said sibling mobile intelligent agent comprising a duplicate of said first mobile intelligent agent created by the computation requester to perform a same said specific computational task and to leave a same said trace as said first mobile intelligent agent in other processing hosts of the plurality of processing hosts in the Byzantine network;
responsive to detecting a presence of a said sibling mobile intelligent agent or a trace left by a said sibling mobile intelligent agent in the processing host,
cease further execution by said first mobile intelligent agent in the processing host to prevent repeating performance of said same specific task in the processing host;
cause onward transmission of said first mobile intelligent agent to another of the plurality of processing hosts in the Byzantine fault-tolerant computing network to perform the specific computational task; and responsive to not detecting the presence of said sibling mobile intelligent agent or the trace left behind said sibling mobile intelligent agent, executing said first intelligent agent in the processing host, leaving the trace in the environment of the processing host, and returning a result of said executing in the processing host to said computation requester.

12. The computer system of claim 11, wherein the processor is further programmed to:

retain an identifier of the processing host within said first mobile intelligent agent in response to detecting a presence of said sibling mobile intelligent agent or a trace left by said sibling mobile intelligent agent.

13. The computer system of claim 12, wherein the processor is further programmed to:

check said retained identifier of the processing host prior to onward transmission of said first mobile intelligent agent; and cause onward transmission to another processing host having an identifier other than said retained identifier.

14. The computer system of claim 13, wherein a plurality of identifiers are retained as a list within said first mobile intelligent agent.

* * * * *